March 12, 1963

D. H. HESTER

3,081,008

SIPHONING LIQUID DISPENSER

Filed Dec. 19, 1960

Inventor:
Dwight H. Hester
By Horton, Davis, Brewer & Burns
Attys.

March 12, 1963 D. H. HESTER 3,081,008
SIPHONING LIQUID DISPENSER
Filed Dec. 19, 1960 9 Sheets-Sheet 3

Inventor:
Dwight H. Hester
By Horton, Davis, Brewer & Bregman
Attys.

March 12, 1963 D. H. HESTER 3,081,008
SIPHONING LIQUID DISPENSER
Filed Dec. 19, 1960 9 Sheets-Sheet 8

Inventor:
Dwight H. Hester
By Horton, Davis, Brewer & Brugman
Attys.

March 12, 1963 D. H. HESTER 3,081,008
SIPHONING LIQUID DISPENSER
Filed Dec. 19, 1960 9 Sheets-Sheet 9

Inventor:
Dwight H. Hester
By Horton, Davis, Brewer & Bergman
Attys.

United States Patent Office 3,081,008
Patented Mar. 12, 1963

3,081,008
SIPHONING LIQUID DISPENSER
Dwight H. Hester, 315 N. Lorel Ave., Chicago, Ill.
Filed Dec. 19, 1960, Ser. No. 76,820
5 Claims. (Cl. 222—416)

My invention relates to siphoning liquid dispensers and more specifically to dispensers adapted to be attached to the mouth of a bottle to dispense measured amounts of liquid therefrom.

My invention has as one principal object the provision of a dispenser which, while employing the flow control principle of admission of air into the bottle and the interruption thereof, does not rely on this principle for the measurement of the quantity to be dispensed. Rather, the dispenser incorporates a fixed measure which is filled and then automatically emptied to determine exactly a quantity of liquid.

Another important object of my invention is the provision of a liquid dispenser adapted for attachment to the mouth of a bottle which incorporates a measuring cup of known capacity which is filled by the flow of liquid from the bottle and is then automatically emptied, further flow of liquid from the bottle being halted while the emptying occurs.

Still another primary object of my invention is the provision of a liquid dispenser adapted for attachment to the mouth of a bottle which incorporates a measuring cup of known capacity having a siphon incorporated therein, wherein the cup is filled by a flow of liquid from the bottle and, when the cup is filled, further flow of liquid from the bottle ceases and the cup is emptied by a siphoning action.

Another object of my invention is the provision of a siphoning liquid dispenser employing the principle of automatically siphoning liquid from a cup of fixed capacity wherein the vertical height of the intake siphon arm may be adjusted to vary the quantity of liquid discharged.

At first glance, a dispenser incorporating my invention would seem to be hopelessly expensive and noncompetitive with existing dispensers. However, I have so devised the dispensers incorporating my invention that they may be formed substantially entirely of inexpensive plastic parts and readily assembled so as to be inexpensive and fully competitive with the products now known, and still another object or advantage of my invention may therefore be considered the ease and cheapness of manufacture thereof.

Other objects and advantages of my invention will be apparent from the following descriptions and drawings, of which.

The liquid dispenser illustrated in FIGS. 1 through 9 consists of three separate molded parts: namely, a body 12, a measuring cup 14 and a sleeve 16. Considering particularly FIG. 5, the body is formed by molding two halves thereof and cementing them together, the halves being defined by a plane dividing the body symmetrically. The line of division of the two halves is designated by 15. The body consists of a large diameter tube 18 inclined at about a 45° angle to the main portion of the body adapted to be inserted into the neck of a bottle 20. The tube 18 includes an internal wall 20' extending longitudinally thereof and spaced substantially toward the bottom side of the tube to define a liquid inlet 22 on the top side of the wall 20' and a bottle air duct 24 on the underside of the wall. The wall and that portion of the tube which, with the wall defines the bottle air duct 24, is extended substantially beyond the end 26 of tube 18 well up into the neck of the bottle as at 28. The bottle air duct should terminate above the level of the cup 14 when the bottle is in pouring position. The upper end of the bottle air duct is constricted as at 30 in order to prevent positively any simultaneous counterflow of air and liquid through the air inlet duct 24. Tube 18 will have a tubular cork 32 fitted thereto and held in proper position by a flange 34 molded on the exterior of tube 18.

The tube 18 turns through 45° at its lower end to become horizontal as at 38, and a circular cup cap 36 is carried on top of the horizontal portion. This horizontal section of tube 18 is U-shaped rather than circular in section (FIG. 3) and the cup cap, in part, forms the top wall 40 of the tube. The cap has a large aperture 42 in the portion 40 thereof.

Figures 1, 3, 4:
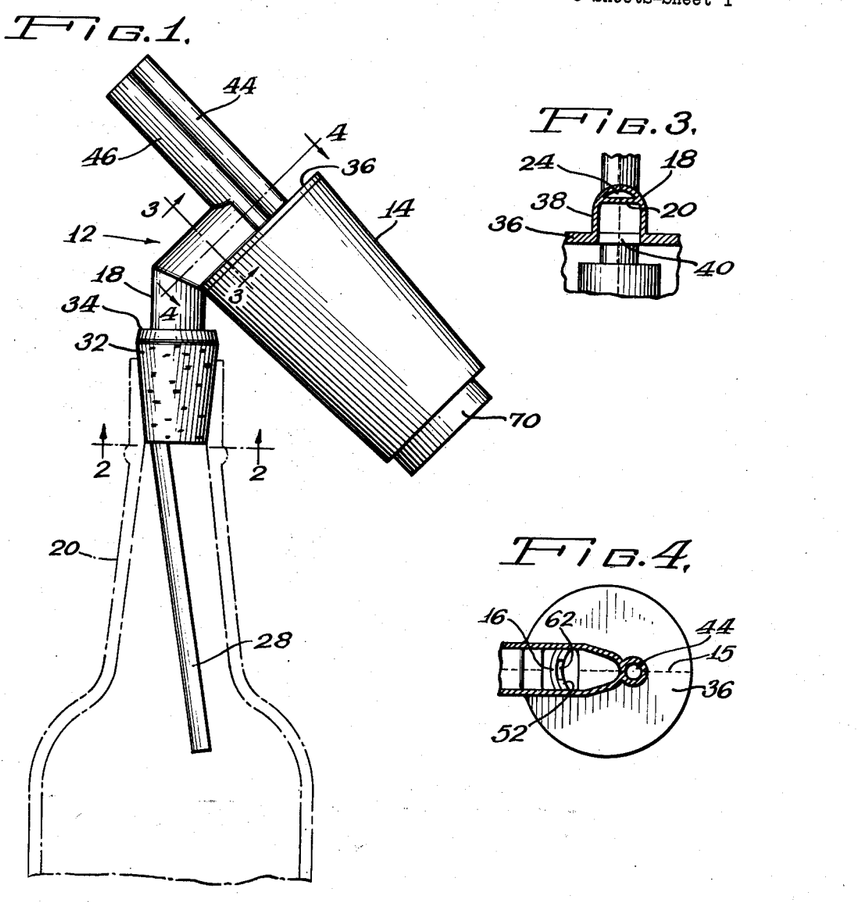
FIG. 1 is a side elevation of a dispenser embodying my invention shown attached to the mouth of a bottle.
FIG. 3 is a section taken substantially along the line 3—3 of FIG. 1 looking in the direction of the arrows.
FIG. 4 is a section taken substantially along the line 4—4 of FIG. 1 looking in the direction of the arrows.
Figure 2:
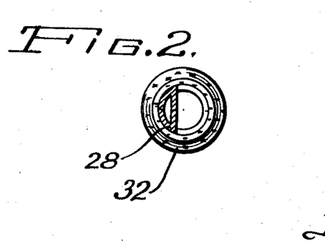
FIG. 2 is a section taken substantially along the line 2—2 of FIG. 1 looking in the direction of the arrows.
Figures 5, 6, 7, 8:
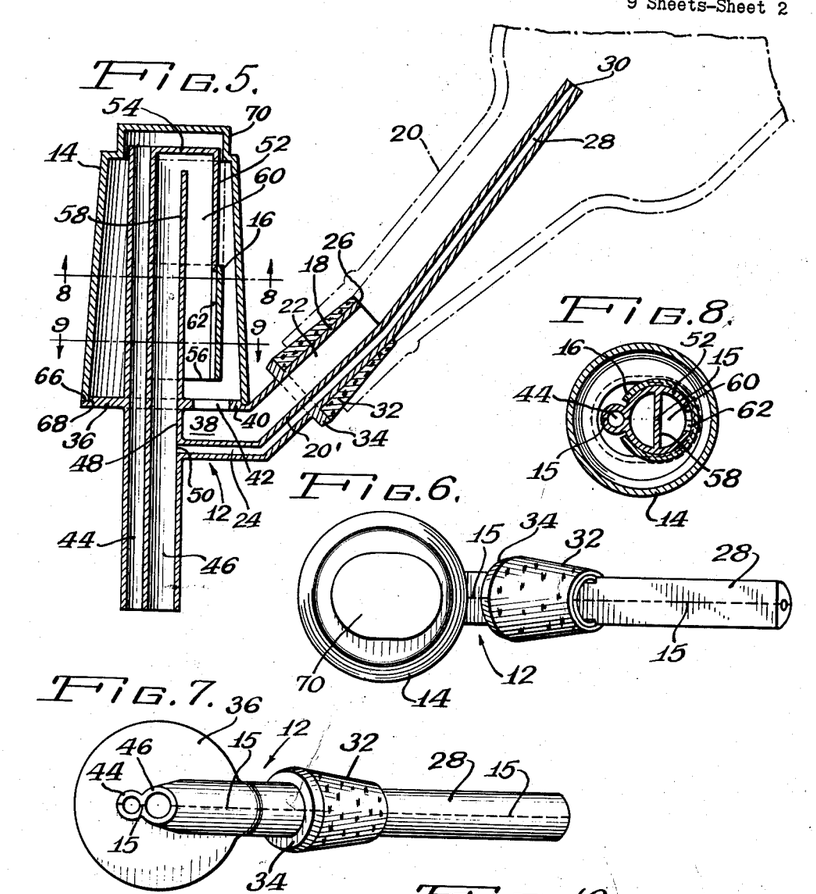
FIG. 5 is a central section through the dispenser illustrated in FIG. 1 shown attached to a bottle and illustrating the dispenser in pouring position.
FIG. 6 is a plan of the dispenser of FIG. 1 looking in the direction of the bottom of the measuring cup.
FIG. 7 is a plan thereof looking in the direction of the top of the cup.
FIG. 8 is a section taken substantially along the line 8—8 of FIG. 5 looking in the direction of the arrows.
Figure 9:
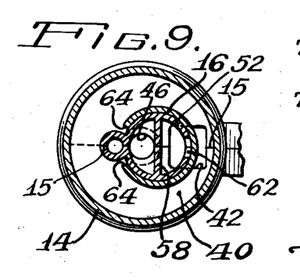
FIG. 9 is a section taken along the line 9—9 of FIG. 5 looking in the direction of the arrows.

The body likewise includes a cup air duct 44 and a liquid outlet tube 46 extending through the cap 36. The cup air duct is a round tube formed integrally on the side of the liquid outlet 46. The liquid outlet differs in section over its length. Downwardly from its intersection with tube 18, it is a simple cylindrical tube (FIG. 7). In the area of its intersection with the tube 18, it is D-shaped in section with the flat side of the D 48 constituting an end wall for the tube 18. The bottle air duct extends through the flat side of the D-section as at 50 to communicate with the liquid outlet 46.

Upwardly of the cap 36, the liquid outlet consists of one-half of a large diameter tube 52 closed at its upper end 54 and terminating at its lower end 56 above the level of the cap 36. The tube has a longitudinal internal vertical wall 58 therein stopping short of the upper closure 54. The wall 58 divides the tube 52 into a siphon, the left side of which constitutes an upward continuation of the liquid outlet 46 (FIG. 5). The right side of the tube 52 may be considered a siphon intake 60. The siphon intake passage has a vertical slit 62 formed in the lower half thereof. It will be noted that the cup air duct extends well above the liquid outlet tube 46 when in pouring position, the duct terminating even with the top wall 54.

The before-mentioned sleeve 16 is a simple tubular member longitudinally slit through as at 64 on one side. The sleeve fits over the lower end of tube 52 with the slit 64 embracing the cup air duct 44. The sleeve 16 is thus adjustable up and down on tube 52 and is used to adjust the effective length of the siphon intake 60.

The remaining component of the dispenser, the measuring cup 14, is a simple cup with its mouth 66 mounted in an appropriate groove 68 in the cap 36. Little need be said of the cup except that it should provide ample clearance for the tube 52 and cup air duct 44 and particularly for the upper end of the duct 44. The illustrated cup includes an oval projection 70 from the bottom thereof in order to provide the necessary clearance for the open upper end of duct 44 and the upper end of tube 52 while at the same time providing minimum measure capacity above the desired level of filling to maintain the accuracy of the measure.

Figure 10:
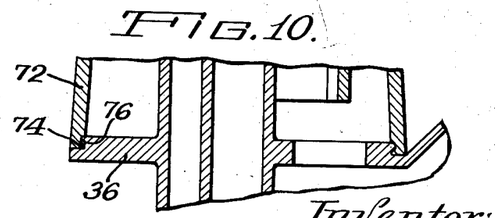
FIG. 10 is an enlarged section similar to the central portion of FIG. 5 showing modified form of cup.
Figure 11:
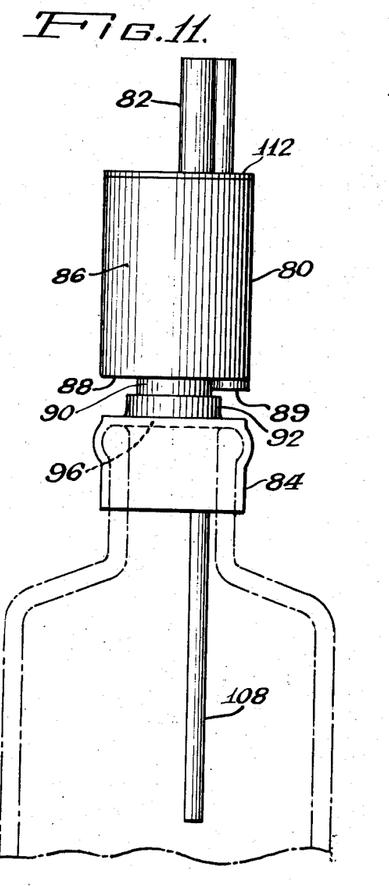
FIG. 11 is a side elevation of a modified form of measuring dispenser attached to the mouth of an upright bottle.
Figure 12:
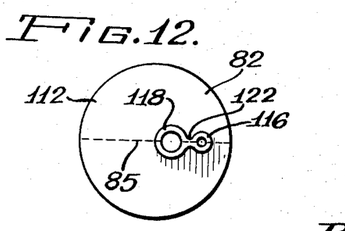
FIG. 12 is a top plan view of the dispenser of FIG. 11.

In FIGS. 1 through 9, the cup is shown permanently mounted to the cap 36. In order to dispense different measures of liquid, it may be desirable to provide differently proportioned cups. To this end, I have shown in FIG. 10 a demountable cup 72. An inwardly directed bead 74 on the inside of the mouth of the cup snaps over an outwardly directed bead 76 on the periphery of the cap 36. By the use of this structure, a variety of cups may be offered for use with my dispenser, and the changing of cups is an easy manual procedure.

The operation of my device will be readily understood from the foregoing description. The bottle with the dispenser mounted to the mouth of it will be turned to the position illustrated in FIG. 5. Liquid will run from the bottle through the liquid inlet 22 and the port 42 to fill the cup 14. Air, in the meantime, will flow up through the outlet 46 and through the bottle air duct 24 and out through the reduced upper end 30 thereof to replace the outflowing liquid. When the liquid fills the cup over the upper end of the wall 58, the liquid will run over the wall and out the liquid outlet 46 to begin the siphoning action. Since the rate of flow into the cup is substantially greater than the rate of flow through the outlet 46, the tube 52 will fill completely so as to perfect the siphon. The siphoning will then begin to empty the cup, the contents of the cup being drawn up through the siphon arm 60. The outflow of liquid through the outlet 46 will shut off admission of air to the bottle through the bottle air duct 24. The outlet of the bottle, the lower end of tube 18, is below the level of the liquid in the cup and therefore sealed thereby. These two circumstances halt the delivery of liquid from the bottle to the cup. On the other hand, the cup air duct 44 delivers atmospheric air into the top of the cup to permit a free siphoned discharge of its contents.

The contents of the cup will continue to flow until the level of the liquid in the cup is drawn down below the bottom edge 56 of the sleeve 16. At this point, air will enter the siphon to break off the discharge of liquid.

At the conclusion of a poured measure, a small quantity of liquid will lodge in the reduced end 30 of the bottle air duct 28 which effectively blocks further flow of air into the bottle in spite of the emptying of the dispenser. To dislodge this droplet, the bottle must be restored to upright position. Thereafter, another measure may be poured.

It will be appreciated that the siphoning action will be terminated before the cup is entirely emptied, due to the length of the siphon intake arm. As a consequence, port 42 in the liquid inlet is covered by liquid. This circumstance, coupled with the stoppage of tube 28, prevents any outflow of liquid from the bottle until one of these two factors is altered.

My dispenser may also be used for continuous pouring, if desired. The bottle is held at an angle such that the inner end of the cup air duct 44 is below the upper end of wall 58. In such case, the liquid will flow into the cup and projection 70 and thence out through the cup air duct. Displacing air will enter the bottle through the liquid outlet 46 and the bottle air duct 24.

Among the notable advantages of my invention is that the cup air duct and the liquid outlet are situated side by side and open in the same direction. In any dispenser, provision must be made for admitting air into the bottle, and some splashing out will sometimes occur through the air inlet, either from turbulence or holding the bottle at an improper angle. The side-by-side location of my two tubes means that any liquid accidentally escaping through the air duct will be delivered into the glass.

The modification of FIGS. 11 through 19 is a remarkably simple and cheaply made form of my invention. It consists only of two molded plastic parts, a body 80, a cap and duct assembly 82, and a rubber sleeve 84 for attaching the dispenser to a bottle.

Each of the plastic parts is molded in symmetrical halves which are cemented together to constitute the complete parts. The line of division of the parts is indicated by numeral 85 or by the sections of FIGS. 13, 15, and 16.

Figure 13:
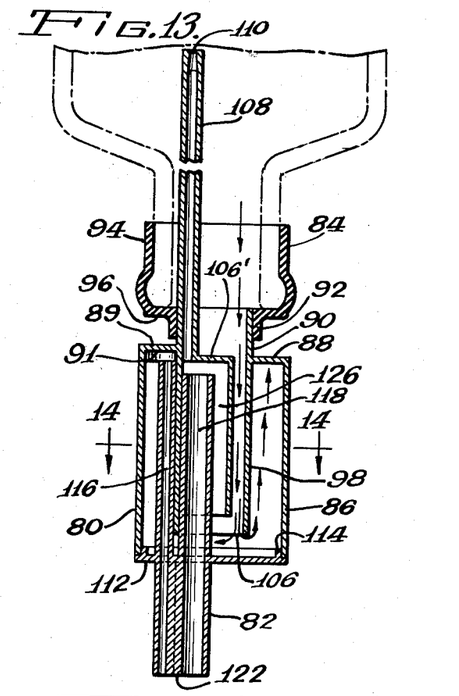
FIG. 13 is a central longitudinal section through the dispenser of FIG. 11 showing, however, the dispenser and bottle in inverted pouring position.
Figure 14:
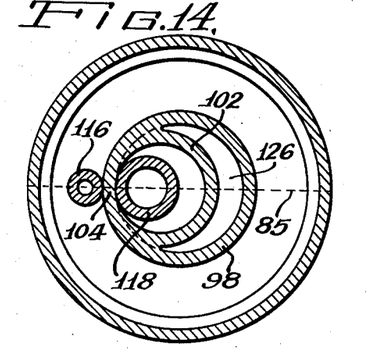
FIG. 14 is a section taken substantially along the line 14—14 of FIG. 13 looking in the direction of the arrows.
Figure 15:
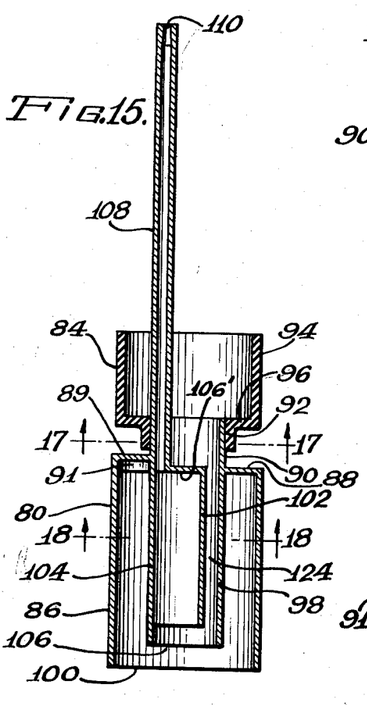
FIG. 15 is a central section similar to FIG. 13 of the body component thereof.
Figure 16:
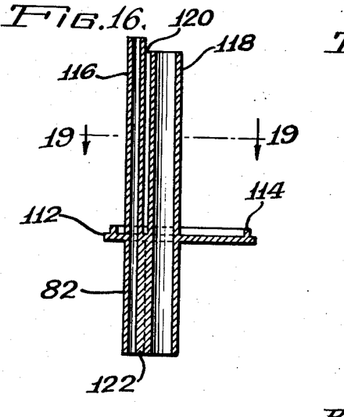
FIG. 16 is a central section similar to FIG. 13 of the duct and cap assembly.
Figure 17:
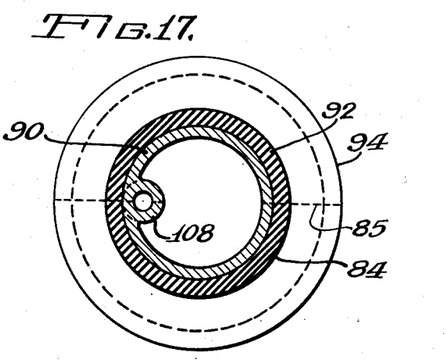
FIG. 17 is a section taken substantially along the line 17—17 of FIG. 15 looking in the direction of the arrows.
Figure 18:
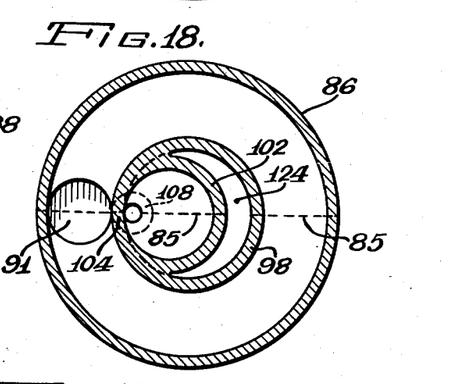
FIG. 18 is a section taken substantially along the line 18—18 of FIG. 15 looking in the direction of the arrows.
Figure 19:
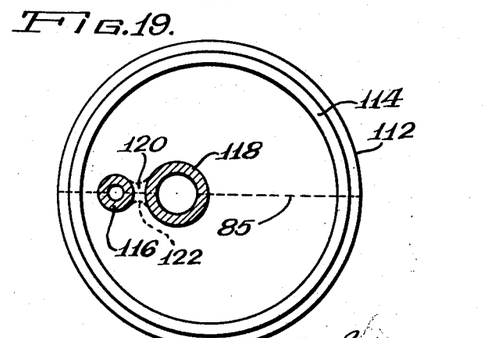
FIG. 19 is a section taken along the line 19—19 of FIG. 16.

Referring particularly to FIGS. 13 and 15, the body consists of an outer cylindrical shell 86 which defines the measuring cup wall, an inwardly directed annular flange 88 at the top of the wall, and a neck 90 extending concentrically with the shell 86 upward from the inside of the flange. The flange has a boss 89 extending upwardly therefrom to define an internal cup or pocket 91 between the shell 86 and neck 90. The neck 90 has a rubber sleeve 84 mounted thereto. The rubber sleeve includes a narrower collar 92 which fits snugly over the exterior of the neck 90, a wider collar 94 proportioned to fit about the mouth of a bottle with a slight degree of stretching as may be best seen in FIG. 13, and a flange 96 interconnecting the two collars.

The body likewise includes internal structure similar to that in the first described form. A tube 98 extends down from the inside edge of the flange 88 in alignment with the neck 90 and terminates a short distance above the bottom edge 100 of the shell 86. A second tube 102 is offset within the tube 98 so as to be internally tangent therewith along line 104 and extends downwardly within tube 98 to terminate a short distance above the bottom 106 thereof. Tube 102 is closed by a wall 106' in the same plane as flange 88. A bottle air duct 108, opening through wall 106', extends upward a substantial distance beyond the remainder of the body and terminates at its upper end in a restricted opening 110. The bottle air duct 108 is tangent with the neck 90 of the body on the same line 104 as tube 102.

The cap and duct assembly 82 consists of the measuring cup cap 112 having a cylindrical flange 114 thereabout by which the cap is secured to the open or lower end 100 of the cup shell 86. A tubular cup air duct 116 and liquid outlet 118 are formed integrally with the cap 84 to extend therethrough and substantially beyond the cap on each side thereof. The cup air duct 116 is longer internally than the outlet 118. The tubes 116 and 118 are separated interiorly of the cap as at 120. Exteriorly of the cap, they are connected by a web 122 to improve the external appearance of the device and impart greater strength to the projecting tubes 116 and 118.

The flange 114 of the cap 112 is, of course, received within the bottom edge of the cup shell 86 as is readily apparent in FIG. 13. As assembled, the liquid outlet 118 is in general alignment with the bottle air duct 108 and spaced measurably below wall 106'. The cup air duct extends into the pocket 91.

The operation of this modification of my invention is substantially similar to that described before. Assuming the bottle to be inverted with the dispenser secured thereto, liquid enters the cup from the bottle through neck 90 and the space between tubes 98 and 102, this space 124 constituting a liquid inlet to the dispenser. The liquid level rises in the cup, the air in the upper part of the cup outside tube 98 being vented off through the cup air duct 116. Liquid is permitted to flow from the bottle by admission of air into the bottle through the liquid outlet 118 and the bottle air duct 108. When the liquid level within the cup rises above the level of the liquid outlet 118, liquid will begin to flow out the liquid outlet and establish a siphon to empty the cup, the siphon consisting of the liquid outlet 118 as the outlet arm and the space between the liquid outlet 118 and tube 102 constituting the intake arm 126. Air enters the cup through the cup air duct 116 to admit air into the cup. Liquid ceases to flow out of the bottle during siphoning since the passage of air into the bottle through the liquid outlet is blocked by the opposite flow of liquid through that outlet and bottom 106 of tube 98 is below the liquid in the cup.

Since the cup air duct 116 and the liquid outlet 118 are side by side, any dribbling of liquid out of the air duct will be received into the container into which the liquid is being poured. The constricted end 110 of the bottle air duct 108 serves to prevent the initiation of a second pouring cycle.

Continuous pouring may again be obtained by inclining the bottle so the upper end of the cup air duct is below the upper end of the liquid outlet. The functions of the two tubes will then be reversed as in my first-described embodiment.

Figures 20, 21, 22, 23, 24:
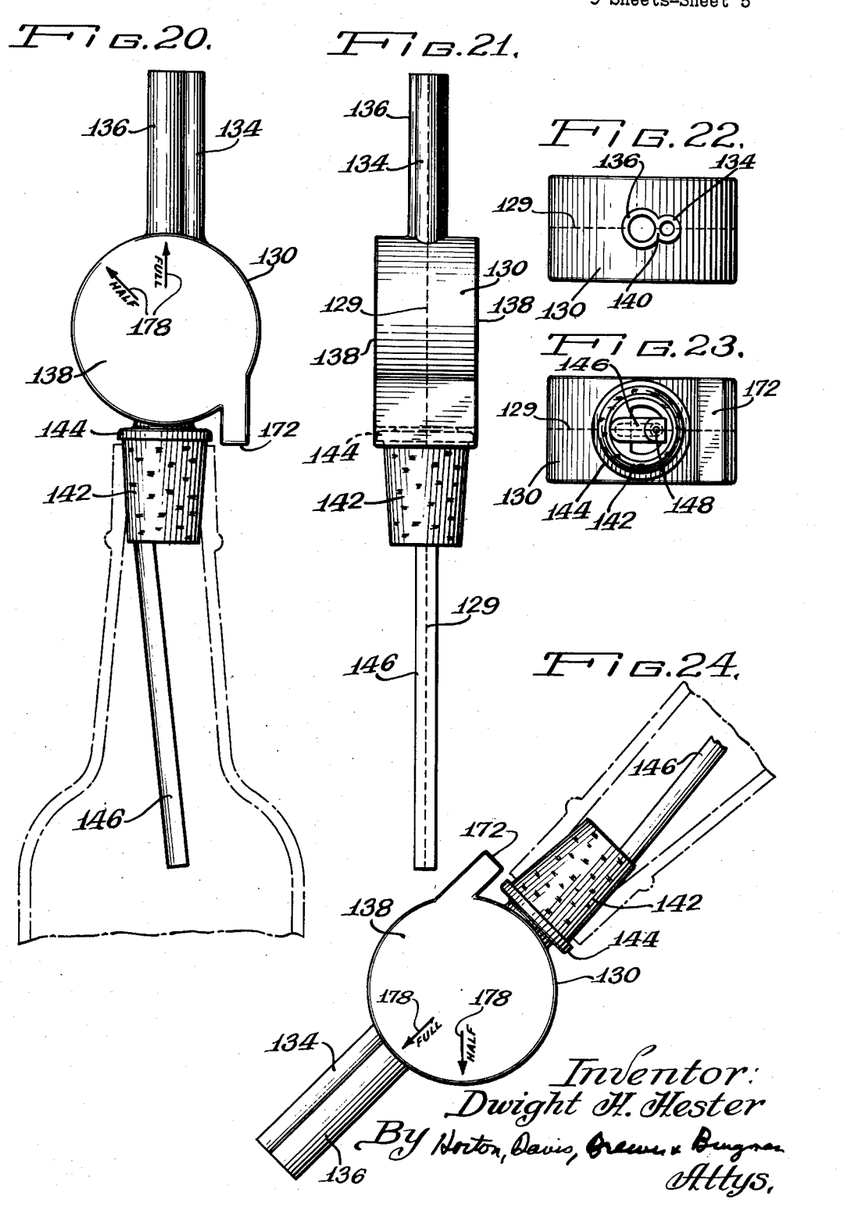
FIG. 20 is a side elevation of another modification of my invention shown attached to the mouth of an upright bottle.
FIG. 21 is an elevation of the dispenser of FIG. 20 taken from the left side thereof.
FIG. 22 is a top plan view thereof.
FIG. 23 is a bottom plan view thereof.
FIG. 24 is a side elevation similar to FIG. 20 showing the bottle and dispenser, however, in a first pouring position.
Figures 25, 26, 27, 28, 29:
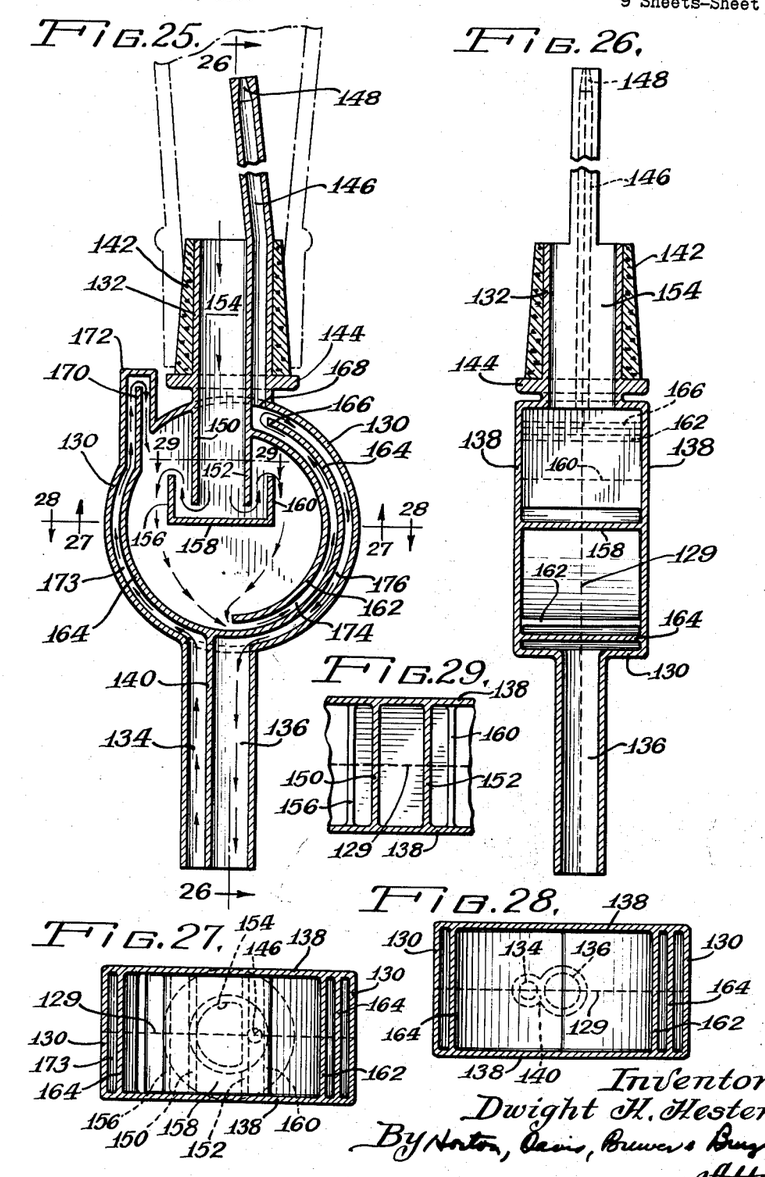
FIG. 25 is a central longitudinal section through the dispenser, the dispenser and bottle being shown in another pouring position.
FIG. 26 is a section taken substantially along the line 26—26 of FIG. 25 looking in the direction of the arrows.
FIG. 27 is a section taken substantially along the line 27—27 of FIG. 25 looking in the direction of the arrows.
FIG. 28 is a section taken substantially along the same line as FIG. 27 looking in the direction of the arrows 28—28.
FIG. 29 is a section taken substantially along the line 29—29 of FIG. 25 looking in the direction of the arrows.

In the third modification of my invention (FIGS. 20 through 28), the dispenser may be made entirely of plastic and will desirably be made of two symmetrical components cemented together, the line of separation being indicated by numeral 129 (FIGS. 21 and 22). FIG. 25 shows one half in internal elevation.

In this modification, considering particularly FIG. 25, the measuring cup consists of a vertical cylindrical shell 130 having a neck 132 at one point on the cylindrical periphery thereof and an external cup air duct 134 and a liquid outlet 136 at the opposite point on the periphery thereof. The cup includes planar ends 138. The external cup air duct 134 and liquid outlet 136 are tangent tubes having a wall 140 separating them.

The neck 132 has a hollow cork 142 thereon adapted to be fitted into the mouth of a bottle. A flange 144 is formed about the neck to locate the cork thereon. The neck likewise includes a bottle air duct 146 internally tangent to the neck and extending well above the neck to terminate in a restricted opening 148 within the bottle as the dispenser is mounted thereon.

Within the cylindrical shell 130, a number of walls are formed extending across the shell between the sides 138 to establish the necessary siphon, air ducts, liquid flow passages, etc. Immediately below the base of the neck within the shell, a wall 150 is extended a little less than half way into the cup in an alignment with the neck wall opposite the bottle air duct 146. A second wall 152 is extended equally downward in alignment with the sides of the bottle air duct remote from the line of tangency of the duct with the neck. These walls with the neck define a liquid inlet 154 from the bottle into the interior of the measuring cup or shell 130.

Other transverse walls 156, 158 and 160 provide a small container situated directly under the inside open end of the liquid inlet 154. The wall 158 is about on the center transverse axis of the shell 130 and the walls 156, 160 extend upwardly above the lower end of the walls 150, 152. The purpose of this container will be discussed subsequently.

A wall 162 extends to the wall 152 of the liquid inlet and follows concentrically around the right hand portion (FIG. 25) of the cylinder wall of the shell 130 to the bottom of the shell. A second wall 164 lies between the shell wall 130 and the wall 162, this wall starting on the right side at a point below the open inner end 168 of the bottle air duct and spaced from wall 152 of the liquid inlet 154. Wall 164 extends around the interior of the cylinder shell wall 130 concentrically therewith, meeting wall 140 which separates the cup air duct and the liquid outlet, and terminating in a vertical free end 170 extending above the normal line of the cylinder shell 130.

The cylinder shell wall is interrupted in the area where the wall end emerges and an integral cap 172 is formed on the cylinder wall above free wall end 170.

The operation of this device is much the same as that described in connection with my first two embodiments. When the bottle is inverted, liquid enters the liquid inlet 154, flows into and overflows the container formed by the walls 156, 158 and 160 and begins to fill the cylindrical shell or measuring cup. Air to replace the liquid flowing from the bottle is drawn in through the liquid outlet 136, through the space between the right side of the wall 164 and the cylinder shell wall 130, into the bottle air duct through open end 168 and into the bottle through the restricted aperture 148. As the liquid rises in the cup, it enters the passage 174 between the concentric walls 162 and 164. The air inside the cup is discharged through the internal cup air duct 173 defined by the space between the left hand portion of wall 164, the adjacent cylinder wall portion 130 and the vertical end 170 of wall 164 and the cap 172 surmounting it.

When the liquid reaches the level of the free end 166 of wall 164, liquid will start to spill over into the passage 176 between the wall 164 and the cylindrical shell wall 130.

The two passages 174 and 176 then define a siphon, passage 174 being the intake side and 176 being the discharge side, and the contents of the cup will be discharged into and out of the liquid outlet 136. The filling of the siphon will block the flow of air into the bottle through the siphon passage 176; the container defined by walls, 156, 158 and 160 encloses the end of the liquid inlet in liquid; and further flow from the bottle is thus shut off. Air is drawn into the cup to replace the liquid siphoned out through the external and internal air ducts 134 and 173.

The particular advantage of this modification of my invention arises from the fact that by holding the bottle at different pouring angles, different measures of liquid may be dispensed. In FIG. 25, the dispenser and bottle are shown in position to deliver a full measure of liquid. In FIG. 24, a pouring angle is illustrated where about a half a measure will be dispensed.

When the bottle is held at the angle illustrated in FIG. 24, the liquid level will reach the point of overflow around the end 166 of wall 164 to establish the siphoning action where the cup is half filled. In order to make the proportional measures precise, I contemplate that marking or arrows 178 be formed on the shell sides 138 to indicate the pouring angle for a desired fractional measure.

Again, continuous pouring may be achieved by holding the bottle at an angle such that the end 166 of wall 164 is above the upper end of wall 170, flow occurring through the cup air duct 134.

Figures 30, 31, 32, 33, 34:
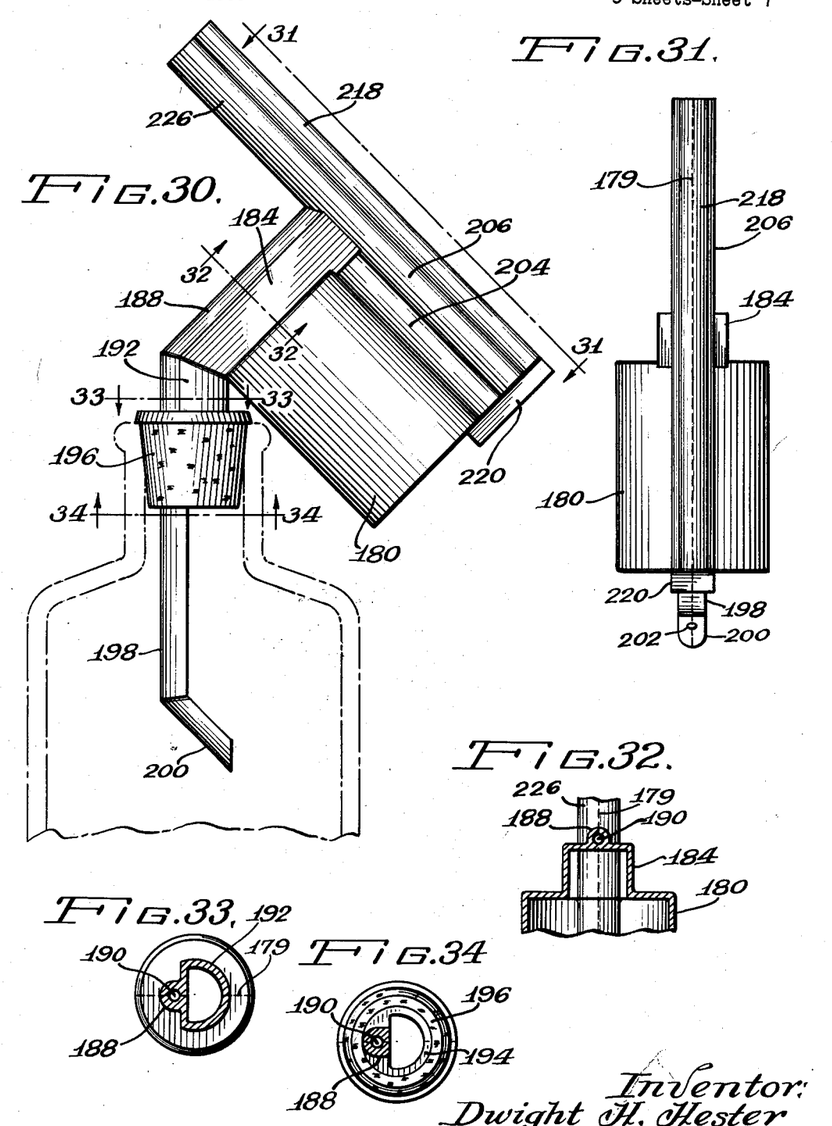
FIG. 30 is a side elevation of still another modification of my invention shown attached to the mouth of an upright bottle.
FIG. 31 is an elevation of the dispenser illustrated in FIG. 30 taken substantially from the line 31—31 of FIG. 30 looking in the direction of the arrows.
FIG. 32 is a section taken substantially along line 32—32 of FIG. 30 looking in the direction of the arrows.
FIG. 33 is a section taken substantially along the line 33—33 of FIG. 30 looking in the direction of the arrows.
FIG. 34 is a section taken along the line 34—34 of FIG. 30 looking in the direction of the arrows.
Figure 35:
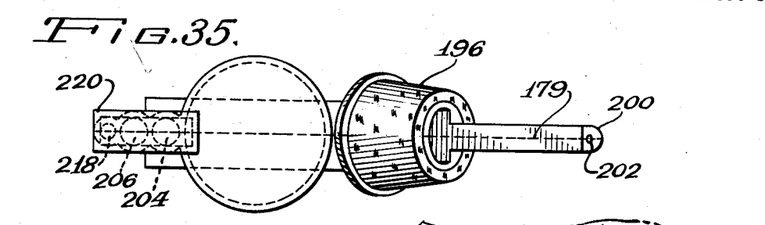
FIG. 35 is a rear end elevation of the dispenser of FIG. 30.
Figures 36, 37:
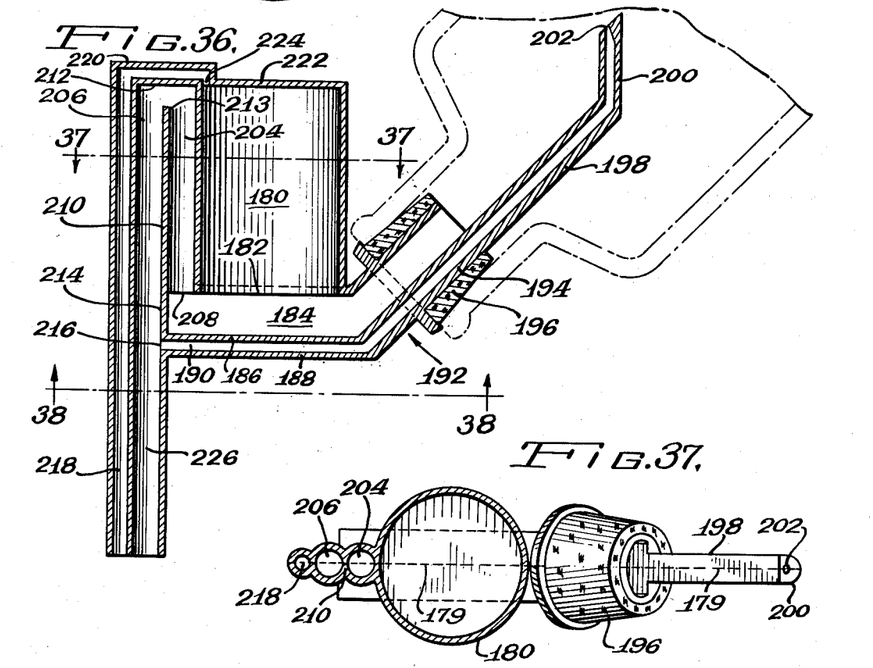
FIG. 36 is a central section through the dispenser of FIG 30 showing the dispenser and bottle in pouring position.
FIG. 37 is a view partly in section and partly in plan taken substantially along the line 37—37 of FIG. 36 looking in the direction of the arrows.
Figure 38:
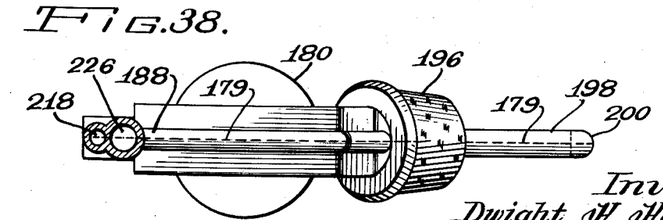
FIG. 38 is a view partly in section and partly in plan taken substantially along the line 38—38 of FIG. 36.

In the modification illustrated in FIGS. 30 through 38, the dispenser may again be formed of two easily molded plastic halves cemented together. The line of partition is identified by numeral 179 (FIGS. 31 and 35). FIG. 36, a section, may also be considered an internal elevation of one of the halves. Considering particularly FIG. 36, the dispenser consists of a cylindrical measuring cup 180 which opens at its lower end 182 into a rectangular liquid inlet passage 184 extending across the bottom face of the cup. The bottom wall 186 of the liquid inlet has a longitudinal boss 188 formed thereon through which the bottle air duct 190 is formed. The liquid inlet 184 turns upward at about a 45 degree angle at one end to define a neck portion 192. At the end 194 of the neck portion, the external cross section of the liquid inlet and the bottle air duct together is circular and mounts a cork 196 by which the dispenser is secured to the mouth of a bottle. That wall portion of the neck in which the bottle air duct is formed extends beyond the cork as at 198, turns through another 45 degree angle to extend directly upward as at 200, and the bottle air duct terminates in a restricted opening 202.

The remaining portion of the dispenser consists of a series of three barrels or tubes lying against each other in a line and against the side of the measuring cup opposite that from which the neck 192 projects. The barrel 204 lying immediately against the measuring cup and the barrel 206 next outside it constitute the siphon. The barrel 204 is open at its lower end 208 into the top of the liquid inlet 184. A common tangent wall 210 extends upward between the two barrels but stops short of the top wall 212 of the barrels as at 213 to leave an aperture interconnecting the interior of the two barrels. The siphon is thus comprised of the intake arm 204 and the discharge or liquid outlet arm 206.

The wall 210 extends downward below barrel 204 to block off the end of the liquid inlet 184 as at 214. Below this point, the bottle air duct 190 opens into barrel 206 as at 216 and wall 210 continues downward from there as simply the cylinder wall of barrel 206.

The outermost tube or barrel 218 is outwardly tangent to barrel 206 and constitutes the cup air duct. This duct is open at its lower end and extends upward to a rectangular box 220 extending across the base of barrels 204 and 206 and overlaps slightly the top wall 222 of the measuring cup 180. The box provides an air passage extending from barrel 218 across the top wall of barrels 204, 206 and into the measuring cup 180 at 224.

Here again, upon the bottle being turned to the position illustrated in FIG. 36, liquid will pour from the bottle into the measuring cup 180 and the intake arm 204 of the siphon, displacing air entering the bottle through the lower end of the liquid outlet 226 and the bottle air duct 190. The liquid will rise in the cup until it starts to spill over the upper end 213 of wall 210. At this point, the siphon is established and the cup is emptied, displacing air entering the cup through the cup air duct 218, 224. Further flow of liquid from the bottle into the cup is prevented during the siphoning action by virtue of the block of the bottle air duct 190 by the liquid siphoning and by immersion of the lower end of the neck in the liquid contents of the cup yet unemptied.

It will be appreciated that the cup air duct, extending up to the box 220, has a greater internal height than the liquid outlet which extends only to the top 213 of wall 210, to insure the desired siphoning action. Continuous flow may again be achieved, however, by changing the angle of the bottle to put the upper end of the cup air duct below the liquid outlet.

In the modification illustrated in FIGS. 39 through 45, the device consists essentially of two molded parts, a unitary body 230 and a cap and passage assembly 232 which will be molded in two longitudinally divided parts and cemented together, and a cork 234. The line of division of the assembly 232 is indicated by numeral 236 (FIGS. 43, 44 and 45), and the assembly illustrated in section in FIG. 43 may be regarded as showing an assembly half in elevation.

The body 230 includes a cylindrical cup portion 238 open at its lower end. At its upper end, a flange 240 carries the contour inwardly to a rectangular socket 242 with rounded ends. A second flange 244 carries the contour further inwardly from the top of the socket to a cylindrical projection 246 matched to the top of the tubular cork 234.

The cap and passage assembly includes an upper cylindrical part 248 and a lower partially rectangular part 250, the first being received snugly in the body projection 246 and the second being received in the socket 242.

The cylindrical part 248 is longitudinally divided by a wall 252 which separates the part into a bottle air duct 254 and a liquid inlet 256 into the dispenser. The bottle air duct extends well beyond the liquid inlet into the bottle and terminates in a restriction 258.

Figures 39, 40, 41, 42, 43, 44, 45:
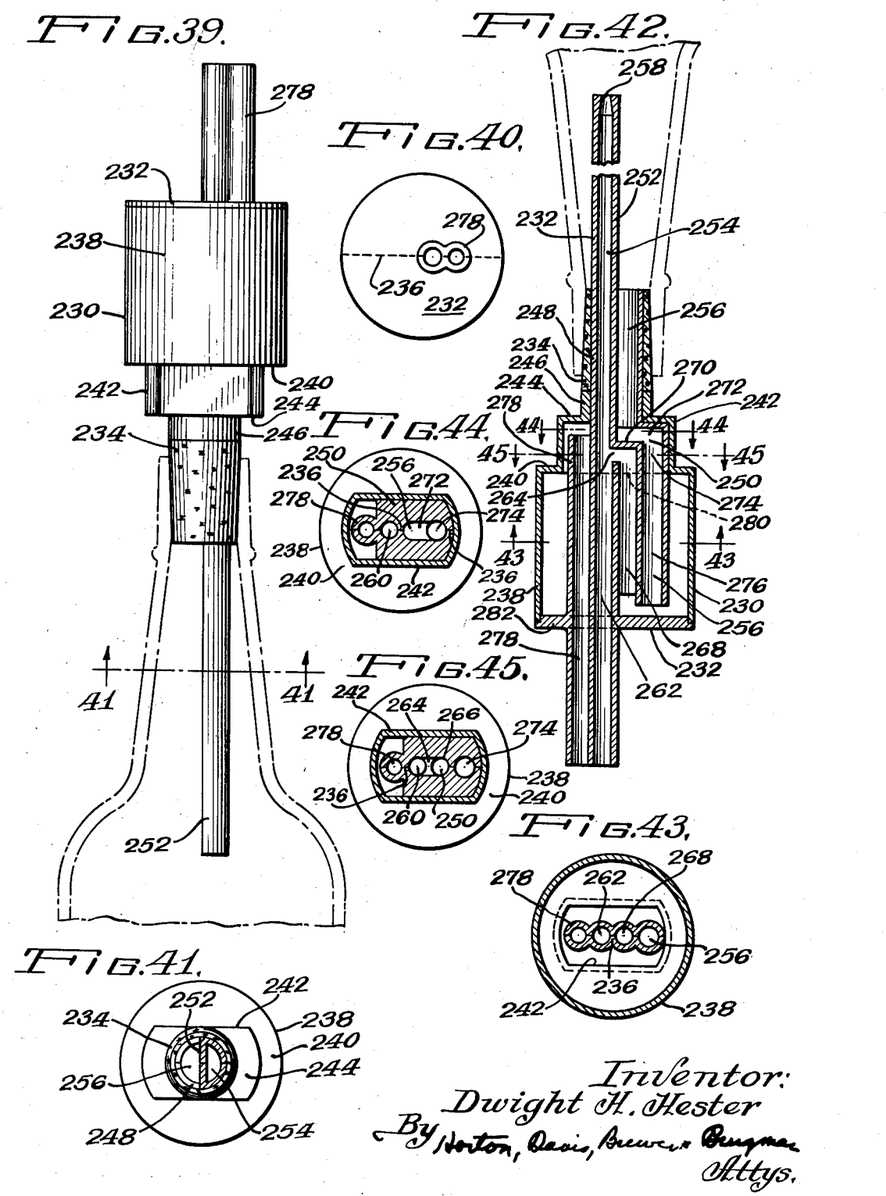
FIG. 39 is an elevation of still another form of my dispenser shown attached to the mouth of an upright bottle.
FIG. 40 is a top plan view of the dispenser as illustrated in FIG. 39.
FIG. 41 is a section taken along the line 41—41 of FIG. 39 looking in the direction of the arrows.
FIG. 42 is a central longitudinal section through the dispenser, the dispenser being in inverted, pouring position.
FIG. 43 is a section taken substantially along the line 43—43 of FIG. 42 looking in the direction of the arrows.
FIG. 44 is a section taken substantially along the line 44—44 of FIG. 42 looking in the direction of the arrows.
FIG. 45 is a section taken substantially along the line 45—45 of FIG. 42 looking in the direction of the arrows.

The rectangular part 250 conforms exactly to the socket in its center and its right side as seen in FIG. 42 (note also FIGS. 44 and 45) but stands away from the socket at the left. The part is formed to have a passage 260 continuous with the bottle air duct 252 therethrough which constitutes the upper end of the liquid outlet or the siphon discharge arm 262. Within the rectangular part, the wall of passage 260 is ported as at 264, and a second passage 266 extends downward therefrom next to passage 260. Passage 266 constitutes the upper end of the siphon intake arm 268. The arms 262 and 268 and the connecting port 264 constitute the complete siphon.

The liquid inlet 256 extends downward into the rectangular part, is stepped to the right (FIG. 42) over the top of the siphon intake arm top wall 270 in a horizontal portion 272 and then continues downward as a passage 274 constituting the upper end of the lower part 276 of the liquid inlet 256.

On the left side of the rectangular part, a tube 278 is integrally formed which stops well short of the top of the part (or the body flange 244) and is spaced well away from the sides of the socket 242. Tube 278 constitutes the cup air duct. It should be noted that tube 278 terminates at its upper end well above the top of the siphon represented by port 264.

The four passages extend downwardly from the bottom 280 of the rectangular part as linearly aligned tangent tubes as may be best appreciated from FIG. 43.

The siphon intake arm 268 terminates downwardly first. The liquid inlet 256 terminates downwardly of arm 268 but still within the cup. The cup air duct 278 and the liquid outlet 262 extend well below the other two. These last have the cup closure 282 formed thereabout which fits into and closes the lower open end of the cup 238. Duct 278 and outlet 262 end in a common plane well below the closure 282.

The operation of this device is substantially the same as those previously described. Upon inversion of the bottle, liquid enters the cup through the liquid inlet 256. Displacing air enters the bottle through discharge arm 262 and bottle air duct 252. When the liquid level in the cup rises to the level of port 264, siphoning action starts and further flow from the bottle is interrupted by the blockage of displacing air due to the outflow of liquid through the discharge arm 262. Displacing air enters the cup through the cup air duct 278. A droplet will form in the restriction 258 of the bottle air duct. When the liquid level reaches the bottom of the siphon intake arm 268, liquid delivery will cease but the cup will not again refill because of the stoppage in the restriction. If the bottle is turned upright and then reinverted, the droplet will be dislodged and the process started again.

Continuous flow may again be had by turning the bottle so that port 264 is above the upper end of the cup air duct 278.

From the foregoing description of my invention in its several modifications, it will be appreciated that the integrating elements underlying the several modifications are, first, a measuring cup which will be filled when the bottle is in pouring position; second, a liquid inlet tube extending close to the bottom of the measuring cup when the bottle is in that position for delivering liquid from the bottle to the interior of the cup, the lower end of which will be immersed in the liquid in the measuring cup until, at least, the desired measure is discharged from the measuring cup; third, a bottle air duct which admits air into the bottle to replace liquid discharged therefrom into the measuring cup but which will be blocked against further admission of air upon the flow of liquid out of the cup through the siphon; fourth, means to define a siphon in the cup whereby when the cup is filled to a predetermined level the liquid will be drained therefrom down to another predetermined level; and, fifth, a duct permitting outflow of air from the cup when the cup is being filled and inflow of air when the cup is being emptied.

It will be appreciated from the foregoing description that the several embodiments of my invention meet excellently the objectives first stated. The mechanism employed in liquid measurement consists of a chamber and a self-starting siphon in the chamber whereby when it is filled to a desired level, further flow of liquid into the chamber is stopped and a siphoned discharge started. When the chamber is emptied to the desired level, the siphon is broken by the admission of air into the intake side thereof. Thus my dispenser is not dependent on variations in air pressure within a bottle but rather depends on filling a fixed measure to a fixed level and then discharging the contents of that measure down to a lower fixed level. It will be further appreciated that because of this principle of operation, my device will deliver a definite quantity of liquid regardless of the amount of liquid remaining in the bottle. It will further be appreciated that, as exemplified in the several modifications described, my invention may be practiced by the employment of a few easily molded plastic parts which are inexpensively made and inexpensively assembled. The cost of my dispensers may be such as to be fully competitive with existent dispensers which deliver a far less accurate measure, and even with ordinary, non-measuring pouring spouts.

It will further be appreciated that, as described in some of my modifications, my dispenser may be made adjustable so as to deliver different quantities of liquid either by adjustment of the dispenser itself or by adjustment of the pouring angle.

It will likewise be understood from the foregoing description that my dispenser is not to be regarded as limited by the described exemplifications. Other alternative arrangements of parts, substitution of materials and other fabrication and assembly procedures may be employed. I, therefore, desire that my invention be regarded as being limited only as set forth in the following claims.

I claim:

1. A liquid dispenser attachable to the mouth of a liquid container comprising, in pouring position, a measuring cup, a liquid inlet attachable to said mouth, a self-starting siphon within said cup having an intake arm and a discharge arm, said discharge arm extending downwardly of said cup and constituting a liquid outlet therefrom, a cup air duct for admitting air into or venting air from the upper part of said cup, said cup air duct extending generally parallel to and opening in the same direction as said liquid outlet, and a bottle air duct for delivering air into said bottle extending into said bottle a distance to be above the uppermost desired liquid level in said dispenser, said bottle air duct being identical with a portion, at least, of said discharge arm, said inlet terminating in said cup to be continuously immersed in liquid.

2. A liquid dispenser attachable to the mouth of a liquid container comprising, in pouring position, a measuring cup, a liquid inlet attachable to said mouth, a wall within said cup defining a self-starting siphon having an intake arm and a discharge arm, said discharge arm extending downwardly of said cup and constituting a liquid outlet therefrom, a cup air duct running generally parallel and opening adjacent to said liquid outlet, and a container air duct for delivering air into said container extending into said container above the uppermost desired liquid level in said dispenser, said container air duct being identical with at least a portion of said discharge arm, said inlet terminating in said cup to be continuously immersed in liquid and the upper portion of said cup air duct being positioned to be above the wall defining said siphon in a first pouring position and below the wall defining said siphon in a second pouring position whereby a measured quantity of liquid may be poured from the container when in said first pouring position and a continuous stream of liquid may be poured from the container when in said second pouring position.

3. The combination as set forth in claim 2 wherein the bottle air duct is constricted at that end thereof within said bottle.

4. A liquid dispenser for dispensing measured amounts of liquid from a bottle which comprises a cylindrical closed measuring cup having vertical parallel walls when said bottle is in pouring position, an open-ended liquid inlet mountable to the mouth of a bottle and extending through the cylindrical wall of said cup, means defining a liquid lock container within said cup having walls extending above the lower end of said liquid inlet when said bottle is in pouring position, walls defining a liquid intake arm and a liquid discharge arm of a siphon within said cup adjacent to and concentric with the cylindrical wall thereof, said intake arm communicating with the interior of said cup at a point opposite said liquid inlet and said liquid discharge arm communicating said liquid intake arm at a point adjacent said liquid inlet, a liquid outlet continuous with said discharge arm of said siphon extending from said cup oppositely to said liquid inlet, means defining an open-ended cup air duct extending adjacent said liquid outlet into said cup and terminating at its upper end above the level of the juncture between said intake arm and said discharge arm and means defining an open-ended bottle air duct communicating at its lower end with said liquid discharge arm and terminating at its upper end within said bottle above said inlet.

5. A liquid dispenser attachable to the mouth of a liquid container comprising two symmetrical halves joined along their common plane of symmetry, said joined symmetrical halves defining, in pouring position, a measuring cup, a liquid inlet attachable to said mouth, a self-starting siphon within said cup having an intake arm and a discharge arm, said discharge arm extending downwardly of said cup and constituting a liquid outlet therefrom, a cup air duct for admitting air into or venting air from the upper part of said cup, said cup air duct extending generally parallel to and opening in the same direction as said liquid outlet, and a bottle air duct for delivering air into said bottle extending into said bottle a distance to be above the uppermost desired liquid level in said dispenser, said bottle air duct being identical with a portion, at least, of said discharge arm, said inlet terminating in said cup to be continuously immersed in liquid.

References Cited in the file of this patent

UNITED STATES PATENTS

| | | |
|---|---|---|
| 2,229,122 | Pershing | Jan. 21, 1941 |
| 2,442,133 | Legarra | May 25, 1948 |
| 2,524,125 | Haid | Oct. 3, 1950 |
| 2,532,787 | Romyns | Dec. 5, 1950 |
| 2,546,188 | Keller | Mar. 27, 1951 |
| 2,667,290 | McPhee | Jan. 26, 1954 |
| 2,678,757 | McPhee | May 18, 1954 |
| 2,689,671 | Berwick et al. | Sept. 21, 1954 |

FOREIGN PATENTS

| | | |
|---|---|---|
| 298,517 | Italy | July 8, 1932 |